(12) United States Patent
Green

(10) Patent No.: US 8,244,101 B2
(45) Date of Patent: *Aug. 14, 2012

(54) DIGITAL VIDEO SEGMENT IDENTIFICATION

(75) Inventor: Dustin L. Green, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1072 days.

This patent is subject to a terminal disclaimer.

(21) Appl. No.: 12/168,751

(22) Filed: Jul. 7, 2008

(65) Prior Publication Data

US 2008/0267584 A1 Oct. 30, 2008

Related U.S. Application Data

(62) Division of application No. 10/108,000, filed on Mar. 26, 2002, now Pat. No. 7,398,000.

(51) Int. Cl.
 *H04N 9/80* (2006.01)
 *H04N 5/93* (2006.01)
(52) U.S. Cl. .................. 386/250; 386/249; 386/353
(58) Field of Classification Search .............. 386/249, 386/250, 353, E5.001, E5.003; 358/908
See application file for complete search history.

(56) References Cited

U.S. PATENT DOCUMENTS

| | | |
|---|---|---|
| 4,538,188 A | 8/1985 | Barker et al. |
| 5,343,251 A | 8/1994 | Nafeh |
| 5,485,534 A | 1/1996 | Takemoto et al. |
| 5,485,611 A | 1/1996 | Astle |
| 5,610,841 A | 3/1997 | Tanaka et al. |
| 5,999,688 A | 12/1999 | Iggulden et al. |
| 6,061,056 A | 5/2000 | Menard et al. |
| 6,205,181 B1 | 3/2001 | Hu et al. |
| 6,356,664 B1 | 3/2002 | Dunn et al. |
| 6,577,346 B1 | 6/2003 | Perlman |
| 6,608,930 B1 | 8/2003 | Agnihotri et al. |
| 6,771,888 B1 | 8/2004 | Cookson et al. |
| 7,058,278 B2 | 6/2006 | Murabayashi |
| 7,110,658 B1 | 9/2006 | Iggulden et al. |
| 2003/0123841 A1 * | 7/2003 | Jeannin ................. 386/46 |

* cited by examiner

*Primary Examiner* — Thai Tran
*Assistant Examiner* — Syed Hasan
(74) *Attorney, Agent, or Firm* — Lee & Hayes, PLLC

(57) ABSTRACT

An entertainment system, having a capability to playback a stored digital video record that includes frames of video data received from a television broadcast system, approximates ranges of frames in a digital video record that are either commercials or non-commercials. The system also approximates frames that are either a beginning or an ending of a commercial or a non-commercial. The system then associates as a commercial two of the approximated frames that are a beginning or an ending of a commercial or a non-commercial and one or more of the approximated ranges there between until a predetermined percentage of the playback time of the digital video record is taken up by the associated commercials.

20 Claims, 9 Drawing Sheets

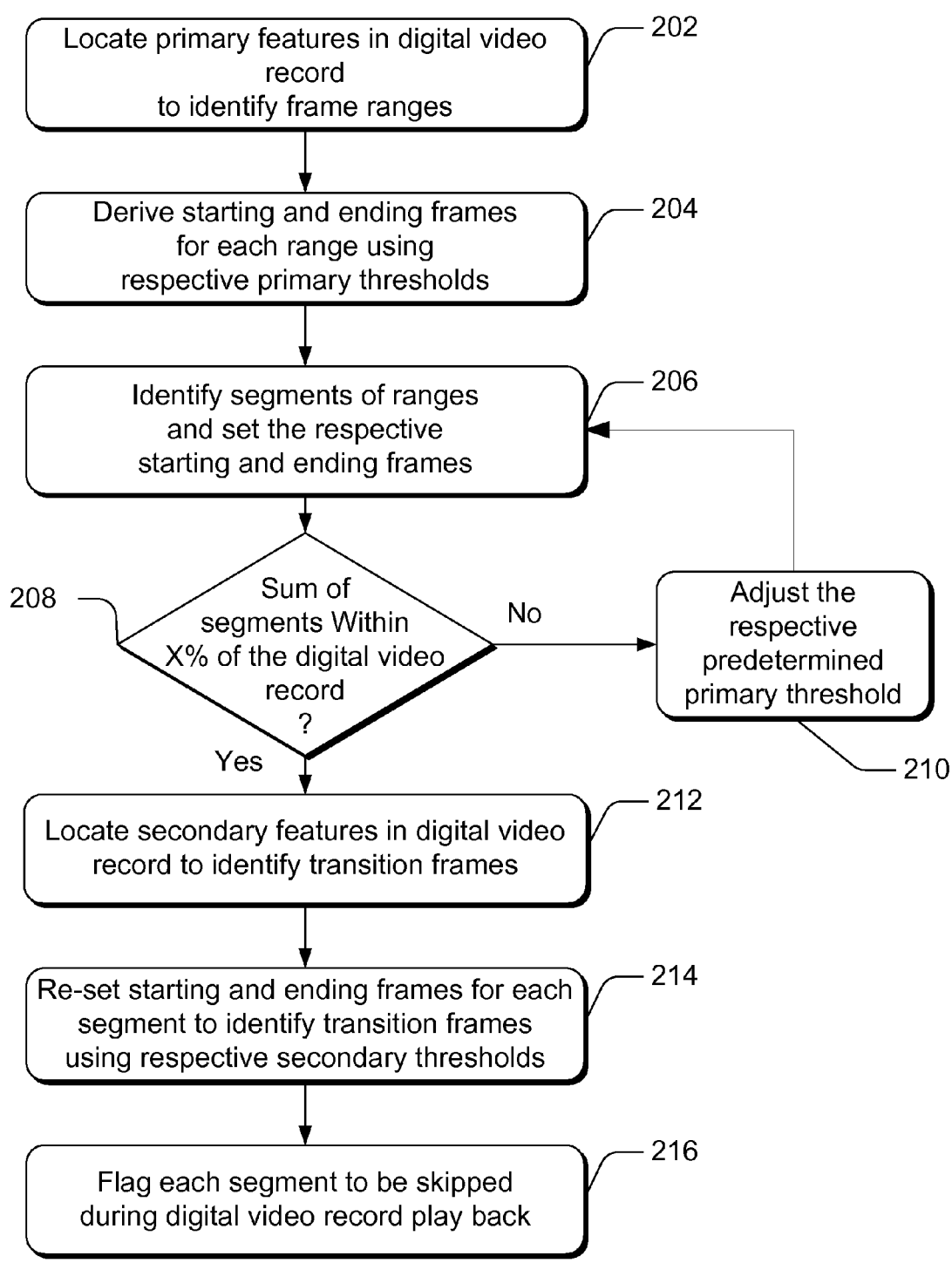

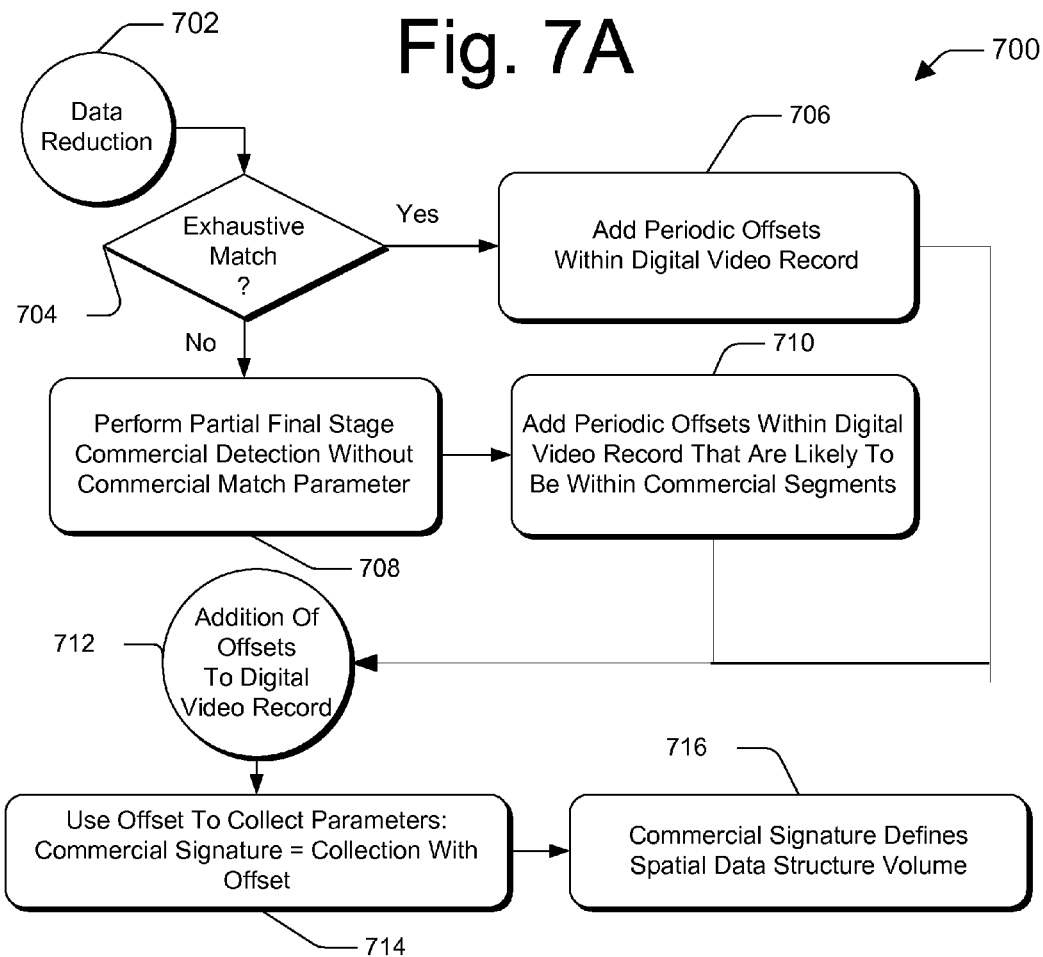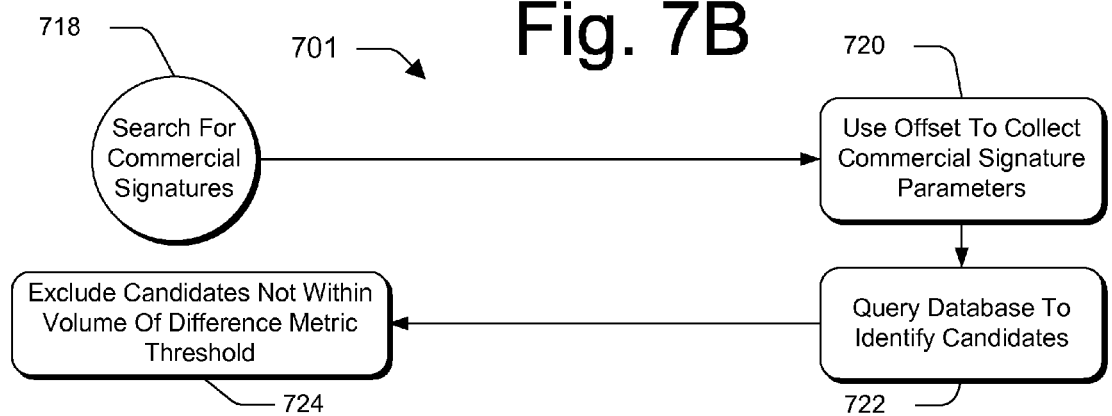

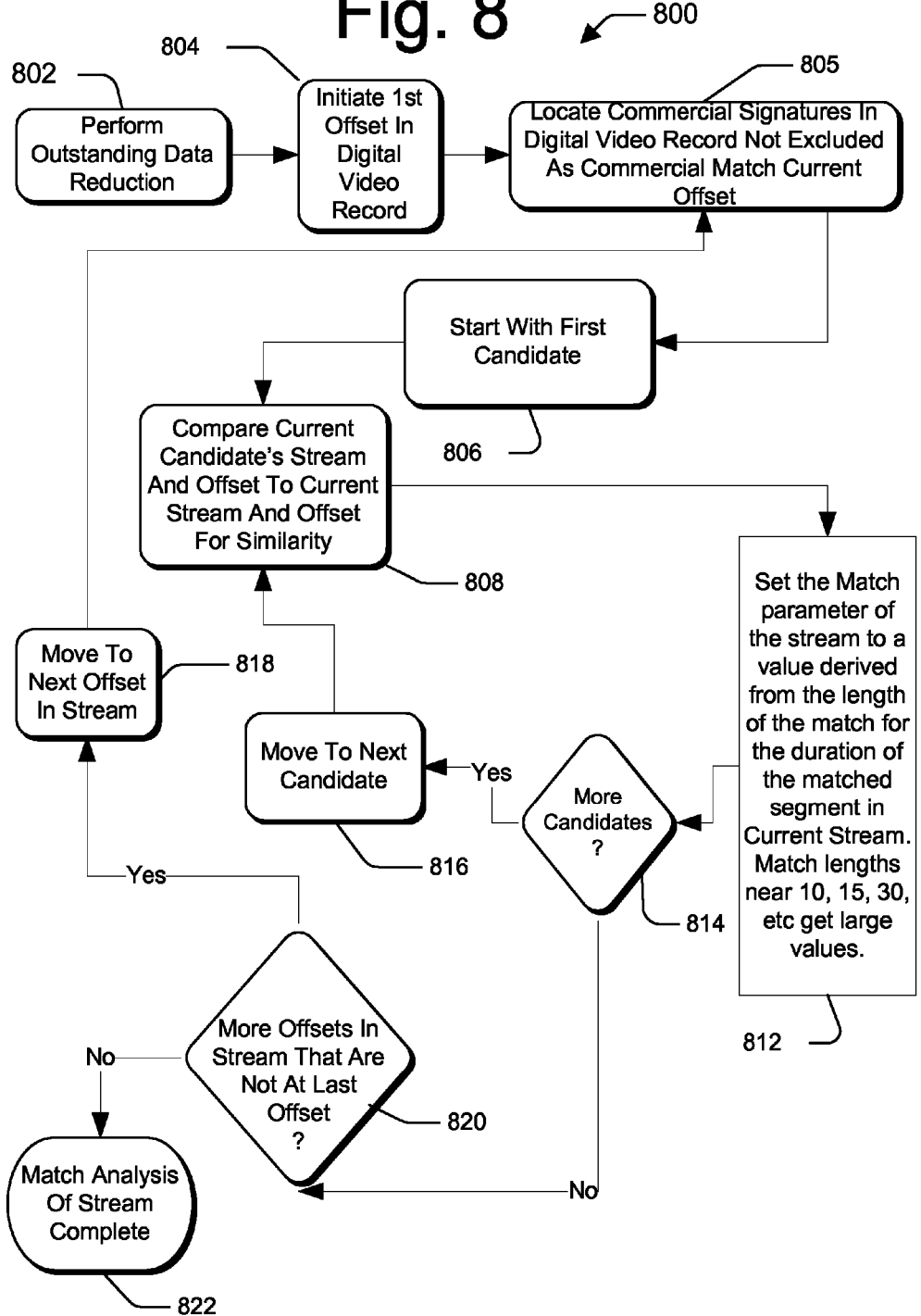

DIGITAL VIDEO SEGMENT IDENTIFICATION

PRIORITY

This application is a divisional of prior pending U.S. patent application Ser. No. 10/108,000, filed on Mar. 26, 2002, which is herein incorporated by reference in its entirety, and priority is claimed to this application. Any disclaimer that may have occurred during the prosecution of the above-referenced application is hereby expressly rescinded, and reconsideration of all relevant art is respectfully requested.

TECHNICAL FIELD

This invention relates to television entertainment architectures and, in particular, to methods, program products, and data structures for identifying a segment of a digital video record.

BACKGROUND

Traditionally, during television programs, viewers have been limited in the ability to control the content of a program being viewed. For example, during a television commercial segment or any other segment that may not be of immediate interest, viewers have been either forced to view the entire segment or change the channel and wait for the segment to conclude. The advent of video cassette recorders (VCRs) allowed viewers greater control over the content of segments when the program was pre-recorded. In recent years some VCR systems have included a relatively unsophisticated one-touch commercial skip feature. The feature consists of little more than a mechanism for automatically fast-forwarding the playback of video data by thirty seconds. By pushing a single button, the VCR automatically advances the video tape by the estimated length of an average commercial segment. While this feature introduces the convenience of a one-touch skip, the length of the skip does not always correspond with the length of a segment that is not of immediate interest to the viewer and is particularly ill-suited for identifying many program transitions that do not have predictable durations.

The advent of digital video formats has allowed for many conveniences not considered practical for a traditional VCR system. Such digital video formats, in particular the Moving Pictures Experts Group (MPEG) and other video compression formats, allow for more sophisticated segment skips. For example, a viewer using a digital video data system that records digital video data in a digital video record on a hard disk or another mass storage device may skip or replay to predetermined scenes, without the time consuming fast forward or rewind of a video tape.

Although digital video systems can more conveniently jump from one portion of a video program to another without having to physically advance a tape, conventional digital video data systems have also generally been capable of advancing between video segments at predetermined increments, such as at thirty-second intervals. Thus, viewers of recorded video data, whether using VCR systems or digital video data systems, have generally been constrained to advancing the video playback in certain, restrictive ways. For instance, the viewer can cause the playback to be skipped ahead by thirty seconds. Alternatively, viewers who wish to advance the playback of a video program past one or more commercials to the beginning of the next non-commercial segment have been forced to place the VCR or digital video data system in a fast-forward mode and then visually identify, by trial and error, the position that represents a segment transition. Accordingly, for entertainment systems that are capable of playing back a stored video program received from a television broadcast system, there is a need for a technique to identify the presence of the one or more commercials in the digital video record so that a playback of the digital video record can use this identified presence during any playback thereof.

SUMMARY

An entertainment system that is capable of playing back a stored digital video record that includes frames of video data received from a television broadcast system, and that identifies commercials in a digital video record that includes frames of video data by approximating ranges of frames that are either commercials or non-commercials, approximating frames that are either a beginning or an ending of a commercial or a non-commercial, and associating as a commercial two of the approximated frames that are a beginning or an ending of a commercial or a non-commercial and one or more ranges there between until a predetermined percentage of the playback time of the digital video record is taken up by the associated commercials.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIG. 2 is a flow diagram that illustrates a procedure for identifying a segment on a digital video record that can be used during a playback of the digital video record;

FIGS. 7a and 7b are flow diagrams that illustrate processes for reducing video data for further processing, adding offsets in the reduced video data, and identifying segments of the video data that might be identical;

FIG. 8 is a flow diagram that illustrates a process for identifying identical segments in the video data using the identified segments of the video data that might be identical from those identified from processes illustrated in FIGS. 7a-7b;

DETAILED DESCRIPTION

The following discussion is directed to an entertainment system that is capable of playing back a stored digital video record that includes frames of video data received from a television broadcast system such as interactive TV networks, cable networks that utilize electronic program guides, and Web-enabled TV networks. The entertainment device can be a client device and can range from full-resource clients with substantial memory and processing resources, such as TV-enabled personal computers and TV recorders equipped with hard-disks, to low-resource clients with limited memory and/or processing resources, such as traditional set-top boxes.

The entertainment systems can be used, in accordance with an embodiment of the present invention, to skip or not skip playback of a portion of a digital video record, such as a commercial, which is in a recorded television (TV) Network broadcast program. Digital video formats are associated with video data compression techniques that compress video images into manageable volumes of data for processing the images on a microprocessor or home entertainment system. In a video compression format such as MPEG, the data encoding each frame contains quantifiable parameters defining various properties of the frame. In a typical video selection, such as a television program, the quantifiable parameters defining the frames of different portions of a digital video record vary with time. For example, the parameters of commercial portions of a digital video record are typically different from those of a television program portion of the digital video record. By analyzing the parameters it is possible to identify both transitions from one portion to a different and distinguishable portion, as well as a range of frames that make up the different portions of the digital video record.

The present invention identifies both transitions and ranges there between so as to allow for skipping, or not skipping, replay to a selected range between transitions. The positions in the video data that are likely candidates for being a range of frames that make up a commercial portion or a non-commercial portion of the digital video record are identified based on the observation of parameters in the video data. In order to approximate any such range of frames, the video data system can use a variety of parameters and techniques to identify "primary features" present in the digital video record. Additionally, the positions in the video data that are likely candidates for being transitions in and out of commercial or non-commercial portions of the digital video record are approximated based on the observation of various parameters in the video data. In order to identify such candidates for transitions, the video data system can use a variety of parameters and techniques to identify "secondary features" present in the digital video record.

Figure 1A:
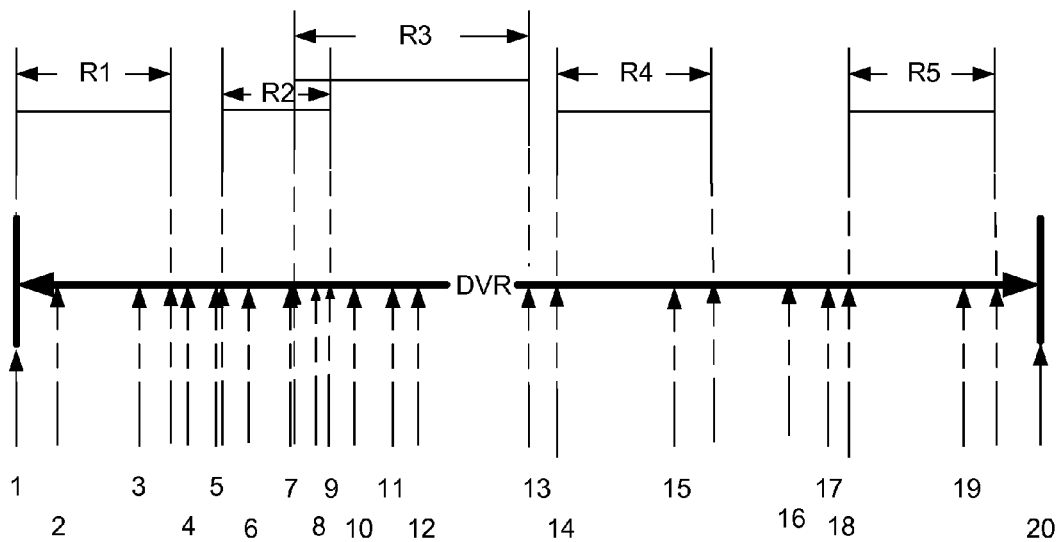
FIG. 1a depicts a digital video record in which ranges of frames have been approximated to be commercials or non-commercials, and in which frames have been approximated to be the beginning or the end of commercials or non-commercials.

FIG. 1a depicts digital video data in a digital video record. For the purpose of this patent, digital video data in a digital video record can be either a commercial or a non-commercial. The digital video record has been divided into approximated ranges of frames that are either commercials or non-commercials, and approximated frames that are either a beginning or an ending of a commercial or a non-commercial. In particular, one or more primary features have been used to approximate occurrences in the digital video data of ranges of frames that are either commercials or non-commercials, as seen at R1 though R5. Note that R2 and R3 overlap. One or more secondary features occurring in the digital video data have been used to approximate twenty (20) different transition frames, as indicated by the numbers 1 through 20 seen in FIG. 1a. Each number from 1 to 20 is an approximation of a frame in the digital video record where a commercial or a non-commercial starts or stops. Also depicted in FIG. 1a are approximated frames in the digital video record that are considered as the beginning or end of each range of frames R1 though R5, some of which are numbered (e.g. approximated frames 1, 9, 13, and 14), and some of which are not numbered (e.g. approximated frames that are the beginning or ending of ranges R1-R5). Optionally, the beginning and ending approximated frame of each range can be treated as a secondary feature to indicate where a commercial or a non-commercial starts or stops.

Figure 1B:
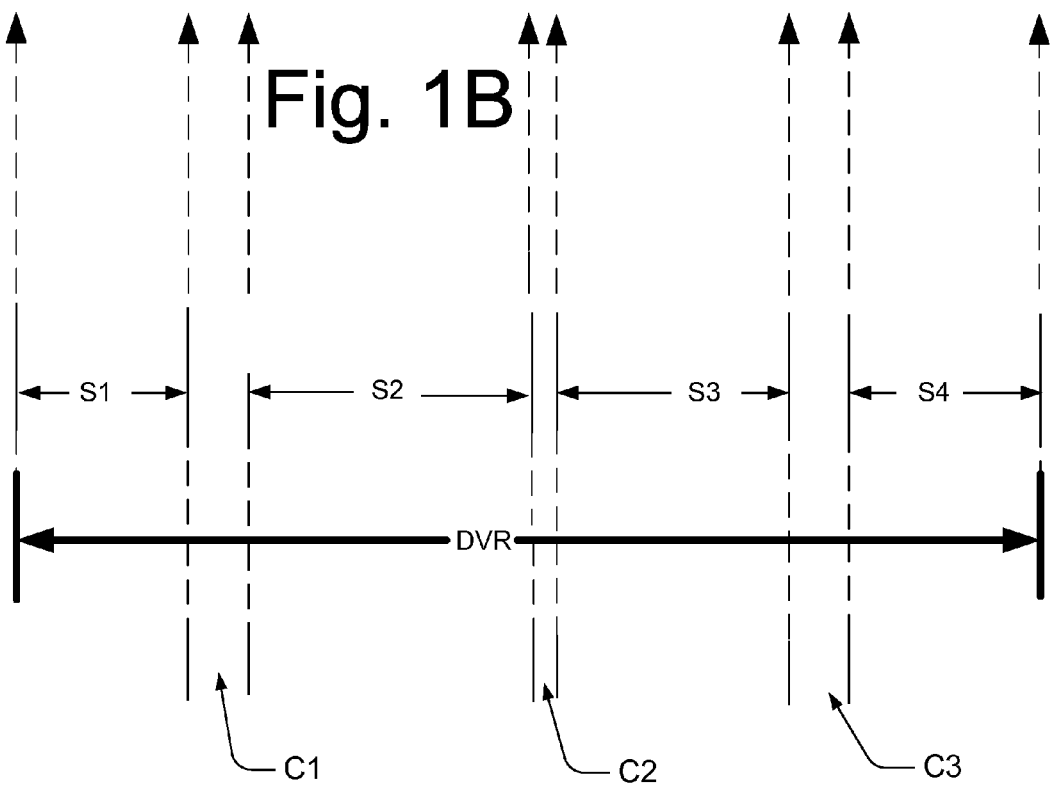
FIG. 1b depicts the digital video record of FIG. 1a after the approximated ranges and approximated frames have been used to derive discrete commercial and non-commercial segments in the digital video record.

The approximated frames, determined by one or more secondary features, and the approximated ranges, determined by one or more primary features, are subjected to various processes through which they are associated into commercials C1 through C3, seen in FIG. 1b. These associations are made by identifying two of the approximated frames that are a beginning or an ending of a commercial or a non-commercial, and by identifying one or more of the approximated ranges there between. These approximations can be adjusted until a predetermined percentage of the playback time of the digital video record is taken up by the associated commercials.

The predetermined percentage of the playback time of the digital video record taken up by the associated commercials can be selected by a user of the entertainment system using a user interface and executable instructions executed by the entertainment system. Alternatively, the range can be preset in the entertainment system according to the type of programming likely for each channel, in a given television market, that the entertainment system is capable of receiving. As such, some channels may not have commercials while other channels may have more commercials than others. As a general rule, a default range for typical television markets is about 20% to about 30% of a typical hour of television programming in the United States.

Given the foregoing, the approximations are made in the digital video record by using respective thresholds for the primary and secondary features such that the digital video record can be separated into commercials C1, C2, and C3. The thresholds for the primary and secondary features are for segmenting the digital video record into commercials and non-commercial on the basis of the type of feature. Once obtained, the thresholds are then normalized by subtracting the respective threshold values, so that a new threshold for each primary feature is now at a value of zero. As such, a resultant positive value would be indicative of a commercial and a resultant negative value would be indicative of a non-commercial. Then, the normalized primary features are combined using a weight-per-primary-feature basis, then an overall threshold is used to do another segmentation based on a combined compound primary feature. A threshold on the combined compound primary feature is then adjusted to arrive at a predetermined percentage of the digital video record (e.g. 20% to 30%). The weight that is used for each primary feature can be selected based upon the accuracy that each primary feature exhibits in approximating a range of frames that is either a commercial or is not a non-commercial. Similarly, the weight that is used for each secondary feature can be selected based upon the accuracy that the each secondary feature exhibits in approximating frames that are either a beginning or an ending of a commercial or a non-commercial. The weights and thresholds are useful in obtaining greater certainty in the approximation of the transition frames and the ranges of frames so as associate the same into commercials.

Different primary feature techniques, only some of which are given herein by way of example and not by way of limitation, can be used to approximate ranges of frames in a digital video record in which a commercial or a non-commercial occurs, where some primary feature techniques are better or more accurate than others at approximating ranges of frames for commercial or non-commercial segments. Similarly, different secondary feature techniques, only some which are given herein by way of example and not by way of limitation, can be used to approximate a frame that is a transition in or out of a commercial of non-commercial, where some secondary feature techniques are better than others at approximating transition frames. Accordingly, the values resulting from each respective primary and secondary feature can be thresholded, normalized, and then weighted according to the accuracy and reliability thereof in the range and frame approximation process, to thereby arrive at and improve the selection of commercial and non-commercial segments in a digital video record.

Those secondary features that are more reliable can be more heavily weighted than less reliable secondary features so as to decide with greater certainty the approximated frames at which there is most likely a transition in or out of a commercial or a non-commercial. Alternatively, more and different types of secondary features can be used and can be weighted accordingly to then decide with still greater certainty on the approximated transition frames.

After approximations, which may be weighted as described above, the digital video record has remaining non-commercial segments seen in FIG. 1b at S1, S2, S3, and S4. Approximated frames 4 and 6 in FIG. 1a are associated with commercial C1 in FIG. 1b. Similarly, approximated frames 13 and 14 correlate to commercial C2, and approximated frames 16 and 18 correlate to commercial C3. Primary and secondary features, used to identify approximations of ranges and frames, respectively, are discussed further below.

During playback of the digital video record, the entertainment system can be preset, or the viewer can issue a request on demand, to skip any playback of the associated commercials therein to the next non-commercial portion. In response to the skip request, the system then automatically skips the playback to the next non-commercial portion that has been identified. As such, the playback of the video data can be skipped to a next non-commercial portion that may be temporally displaced from the current playback position by an arbitrary amount of time, rather than by a predetermined amount of time, such as thirty seconds. Moreover, the viewer can rapidly and conveniently skip through a commercial portion of the recorded video data without being required to place the video data system in a fast-forward mode, view the remaining portion of the video data in the fast-forward mode, and then resume the normal speed playback mode when the current commercial portion is completed, as has been required in many conventional systems. Alternatively, during playback of the digital video record, the entertainment system can be preset, or the viewer can issue a request on demand, to skip any playback of the associated non-commercials. The system then automatically plays back only the commercial portions by skipping the identified non-commercial portions.

One embodiment of the present invention is depicted by a process 200 seen in FIG. 2. Process 200 can be performed in an entertainment system that is capable of playing back stored frames of video data and that is used to flag a portion of the stored frames of video data that are to be skipped during a playback of the stored frames of video data. As seen in FIG. 2, process 200 begins at block 202 where the entertainment system locates the primary features in the stored frames of video data to approximate one or more ranges of frames. At block 204, a starting frame and an ending frame is approximated for each range, both of which can be approximated using a predetermined primary threshold for the particular primary feature occurring in the digital video record. These approximated starting and ending frames can be flagged. A check can be made here as to the certainty of the respective approximated ranges, to determine if the starting and ending frames are separated by a duration corresponding to certain selected durations, e.g. 10 seconds, 15, seconds, 30 seconds, etc., as are typical of commercials in Network broadcast television programming. At block 206, approximated ranges that overlap or are adjacent to other approximated ranges with not more than a predetermined number of frames there between are combined into a segment. Also at block 206, any range that is not so combined will be deemed also to be a segment. Each segment can be designated to begin and end, respectively, at the chronologically first and last starting and ending frames of the respective range or ranges thereof. At block 208, an inquiry is made as to whether the collective time length of the segments is within a predetermined percentage of the playback duration of the digital video record. If not, block 210 of process 200 brings about an adjustment to one or more of the predetermined primary thresholds on the respective primary features occurring in the digital video record and process 200 returns to block 206 at which the segments are recomputed. The inquiry at block 208, the adjustments at block 210, and the re-computing at block 206 is repeated until the collective time length of the recomputed segments is within the predetermined percentage. While about 20% to about 30% of the playback time of the digital video record is contemplated for the predetermined percentage for most television markets in the United States of America, other ranges are also contemplated, depending upon the type of programming of a particular television market and/or television channel.

Secondary features in the digital video record are located at block 212 of process 200. Secondary features occur in the stored frames of video data and can be used to identify a respective one or more transition frames in or out of a commercial or a non-commercial. Each transition frame can be approximated by a predetermined secondary threshold that is selected on the basis of the particular secondary feature. The approximated frames can be flagged for later use of the flags. At block 214, the starting frame and the ending frame of each segment are then re-identified with one of the approximated transition frames. This re-identification is based upon the predetermined secondary threshold and the chronological location of each transition frame with respect to the chronological location of the starting frame and the ending frame of the respective segment. Each segment can then be flagged at block 216 of process 200. The flags referred to above, or similar indicators, can be organized into a data structure that is stored in the entertainment system. The data structure can be used during a playback of the stored video data of the digital video record in order to skip commercials during a playback of the corresponding digital video record. Alternatively, the data structure can be used during a playback of the stored video data of the digital video record in order to skip only non-commercials and to play only commercials.

Primary Features

Different and many attributes occurring in video data from Network broadcast television programming can be used as primary features. Any such primary feature now known, or yet to be understood, developed, or implemented, is intended to be used and is considered to be within the scope of one or more embodiments of the present invention. By way of example, and not by way of limitation, several primary features are discussed below.

One of the primary features that can occur in the digital video record is a substantially repeated portion of video data, which is typical of commercials that are played more than once in a television program. As such, this primary feature can be used to identify substantially identical sets of frames by comparing multiple sets of contiguous frames in the stored frames of video data to other such sets in the digital video record, or to sets of contiguous frames of video data in a pre-existing database of known commercials. Here an assumption is made that a viewer would not wish to watch identical segments in a digital video record, such as repeated commercials. Each substantially identical set of stored frames of video data is approximated as being a range, where the approximated range is approximated using the predetermined primary threshold selected for this particular primary feature. By way of illustration of a threshold for the primary feature of duplicate ranges, each range can be flagged to have a value that is representative of how close the range is to a typical length of a commercial (e.g. 60, 30, 15, or 10 seconds). As such, ranges that are duplicates and that have a playback duration of about 60, 30, 15, or 10 seconds could be flagged to have the highest value. Conversely, ranges that are duplicates but that have a playback duration that deviates from these typical commercial durations could be flagged with a lower value, depending on the degree of deviation. It may be desirable, depending upon the programming of the television market and/or television channel, to identify ranges that are within a particular duration range, such as more than 5 seconds and not more the 2 minutes, to ensure that ranges that are likely to be commercials will be flagged.

When the length of time between adjacent substantially identical sets, or between known commercials, is not more that a predetermined time length, the frames there between can also be approximated to be a range, such as where a commercial is between two previously identified commercials. Here, the starting and ending frames of the range can be, respectively, the ending frame of the chronologically first of the substantially identical sets and the starting frame of the chronologically last of the substantially identical sets.

Another way of identifying commercials in a digital video record is the primary feature of specific words or non-word indicators in closed captioning data. This primary feature can be located by comparing closed caption text corresponding to stored frames of video data to a pre-existing database of known commercial words, phrases, and non-word indicators. A comparison can be done to identify a match there between. For each match, a starting and an ending frame of a range can be set around the known commercial words and phrases as set by a particular predetermined primary margin. For example, a match might be found in a close captioning stream of text that is a trade name or trademark, or on a phrase that is a telephone number that does not have a '555' prefix. Other phrases can also be in the database, such as "operators are standing by". The textual close proximity of well known trademarks and trade names can also be used in setting a range. Symbols or other non-work indicators can also be used to set a range.

Another way of identifying repeated video data in a digital video record that is indicative of a commercial is the primary feature of repeated closed captioning data. This primary feature can be located by comparing closed caption text corresponding to stored frames of video data to other such data in the digital video record or to corresponding sets of frames of video data in a pre-existing database of known commercials. This text comparison is done to identify a match there between. For each matching frame, the starting and ending frames of the respective range can be set to be separated from the respective matching frame by a particular predetermined primary margin. Matching a string of contiguous words and non-word control data in closed captioning from showing to showing of the same commercial is one such technique. For each range having a corresponding matching frame, the starting and ending frames of the range can be re-set, respectively, to the chronologically first and last starting and ending frames for all of the matching frames within the range. Another way to achieve the same result is to create one range that contains all the frames involved in the matched closed captioning data by setting the starting frame of the range to be the frame that is before the chronologically first frame of the match by the predetermined primary margin and setting the ending frame of the range to be the frame that is after the chronologically last frame of the match by the predetermined primary margin.

An entertainment system can be used to identify commercials in a television broadcast even when the entertainment system is not being used by a user to record or play back a digital video record. When the entertainment system is otherwise idle, one or more tuners in the entertainment system can be used to monitor one or more channels, and those channels can be analyzed for commercials. A database of known commercials can then be built up by and stored in the entertainment system for future use in identification of those commercials in a digital video record. By way of example, a database of commercials can be built by the entertainment system by use of its one or more tuners to monitor one channel with each tuner. This monitoring examines strings of text in the closed captioned data being broadcast. When a string of closed captioned text in one range of frames matches that of another, this indicates a commercial. When there are two sets of close captioning data that each match another set of closed captioning data, and these two sets are separated in time by a duration typical of a commercial, the separating interval will also likely be a commercial. As such, all or a portion of the closed caption text of the likely commercial is then stored in the database. When a closed captioned text of a digital video record is compared to this database, matches to the database can be found and the match in the digital video record can be flagged. The flagged match can then be used for a variety of purposes, such as to prevent the showing of the same commercial in the digital video record upon playback, or to show only the commercials in the digital video record upon playback.

Figure 5:
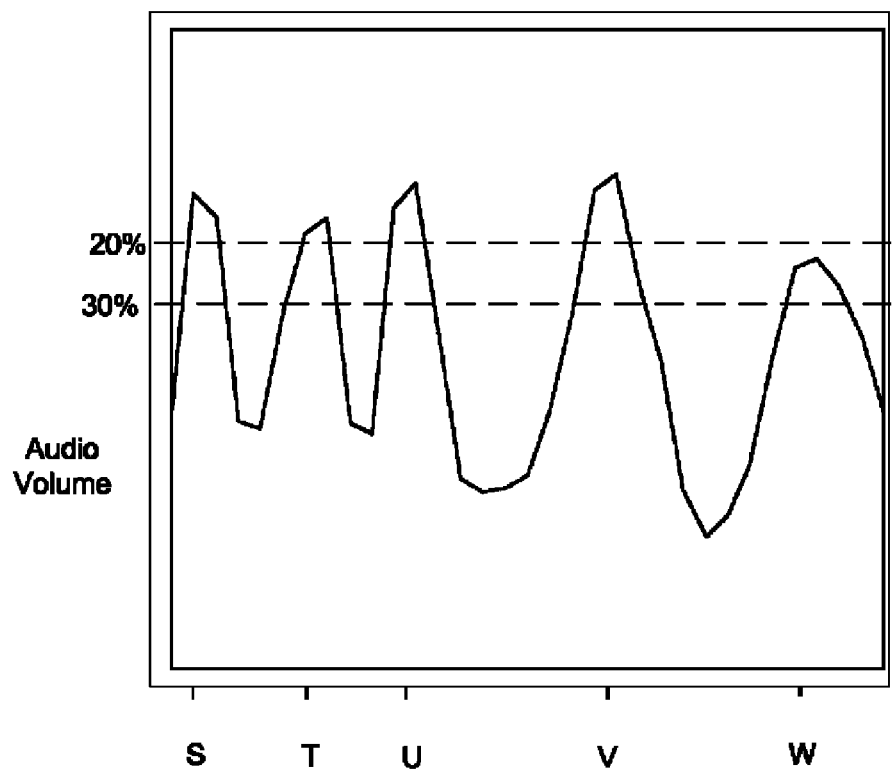
FIG. 5 depicts a time graph of audio volume.

Another useful primary feature involves an evaluation of one or both of audio volume and active audio frequency bandwidth for changes. Either of these may be higher or lower for a commercial. As seen in FIG. 5, a graph is made of the volume of a portion of a digital video record. A threshold is selected that separates the digital video record into ranges that are each categorized into one of two categories by the threshold, one category that is 20-30% of the digital video record, and the other category being the remainder. The intersection of the threshold with the graph marks the transition points as determined by the primary feature. Secondary features can then be used to refine or confirm the transitions identified by the primary feature.

The quality of video data in a digital video record can be a useful primary feature. Some commercials are produced with higher quality than some non-commercials such as rerun television programs. To detect an increase in quality, the maximum sharpness can be derived by an edge detection filter (EDF) over an entire frame in one or more frames of the digital video record. The output of the EDF, which gives a metric for sharpness, will have a magnitude at any given position in the frame. As such, the maximum value for all of the points in the frame can be found, which is the maximum effective resolution and is a sharpness measure. Accordingly, video sharpness as a whole can be used a primary feature.

The amount of video data in the digital video record can be quite large. An entertainment system can be designed to process and analyze large amounts of video data. Alternatively, as is common to consumer electronics, the entertainment system may be designed to process a digital video record for recording and playback as efficiently as possible, due to lack of processing power or other demands on the entertainment system. It may be desirable to reduce the amount of video data in the digital video record that is processed and analyzed in order to identify primary features.

Figure 3:
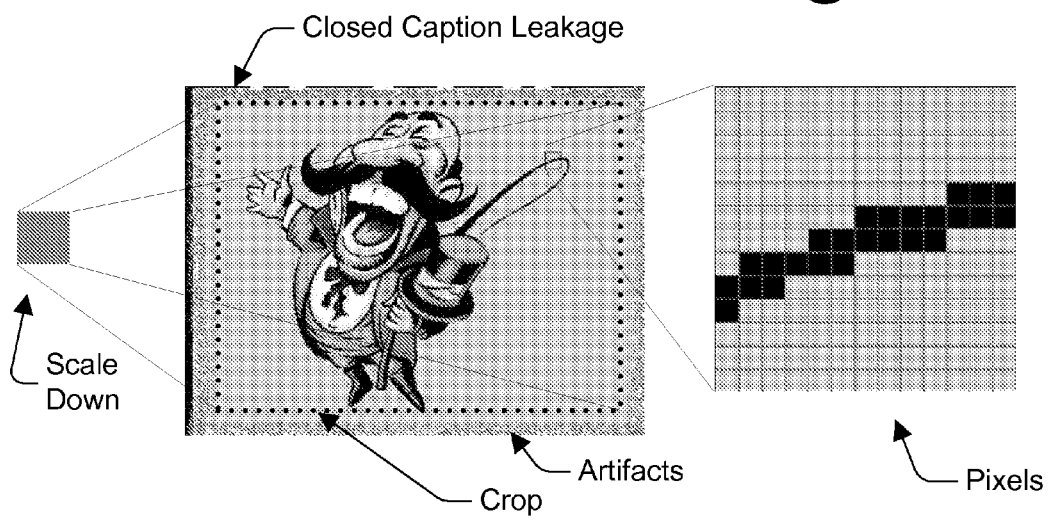
FIG. 3 depicts a full frame of digital video, a portion of the pixels of which are enlarged.

FIG. 3 shows a full frame of digital video, including a non-visible region. The digital video frame is made up of pixels, as illustrated in magnified view on the right of FIG. 3. Analog closed caption data leakage is illustrated at the top of the frame, and a black bar can be seen on the left edge of the frame. Also, at all four edges of the video frame, compression artifacts are illustrated to be more prominent than in the visible region of the frame. In order to reduce the amount of video data in the digital video record to be processed by the entertainment system, the non-visible region of each video frame can be cropped to leave only the visible region of the video frame. This is deemed not be a critical loss of important video data in that the visible region is the region that most television sets can actually show on the screen. In FIG. 3, the dotted line represents the visible region of the video. A single pixel is seen at the left side of FIG. 3 to illustrate a scale down of the visible portion of a video frame. In this case, the scale down process has been made down to one pixel, although other types and kinds of scale downs are also contemplated as a way to reduce the amount of video data that the entertainment system processes in order to identify primary features, such as the identification of identical ranges of frames (i.e. repeated commercials).

The visible area of the video data can be cropped as a form of data reduction. The outer periphery/edges of the video portion of the data is cropped and an algorithm processes only on the visible area of the video data. This is done because there is often more variation in the edges of video data than there is in visible area. The cropping of the data can be done at the pixel resolution level. The edges are substantially dissimilar, especially at the top where there can be closed captioning data leakage in an analog representation of the NTSC signal that leaks down into the encoded MPEG signal. The cropping of the visible area ensures that the encoded MPEG signal is examined where practical.

Figure 4:
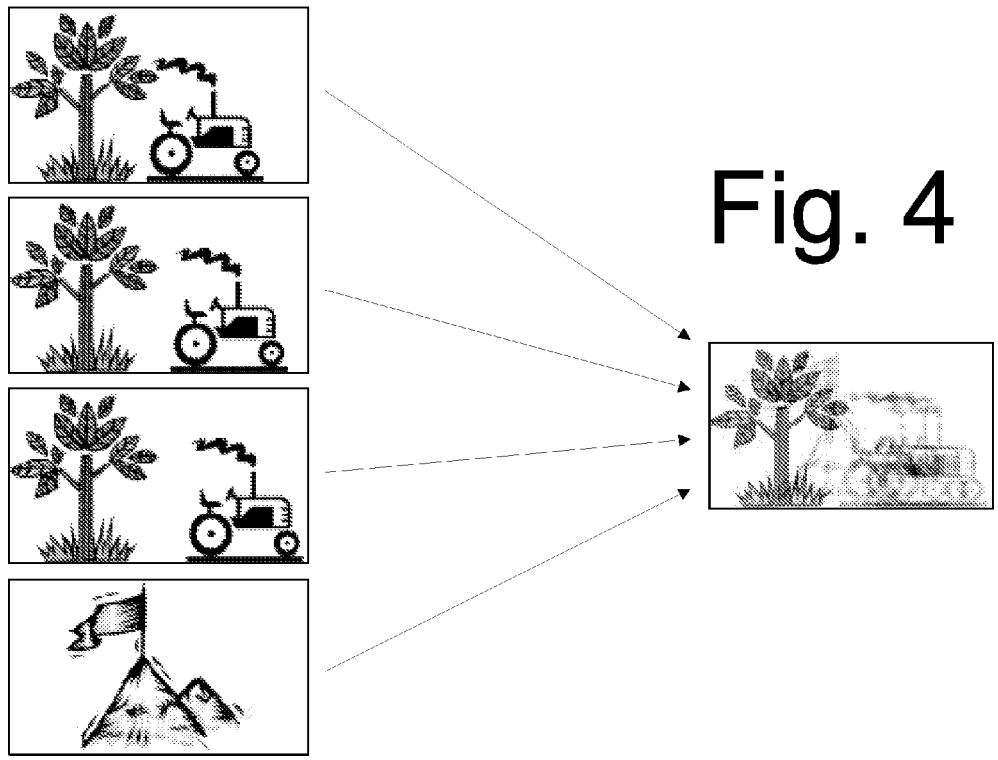
FIG. 4 is an illustration of time window averaging.

FIG. 4 illustrates an example of time window averaging (TWA). TWA can be used with embodiments of the present invention and is another way to reduce the amount of video data in a digital video record to be processed by the entertainment system. As seen in FIG. 4, four frames on the left are averaged together to obtain a single frame that is the average of the four frames. The frames on the left are in time sequence from top to bottom, and there is a scene transition between the last two frames. This process can be carried out before or after a scale down process, as is shown in FIG. 3, but performing this process after a scale down process can be more efficient. Some repeated commercials are not complete duplicates, but rather are different by having a few more or less frames. As such, TWA is desirable because it can be implemented so as to decrease the effect of an extra or missing frame when performing detection of substantially identical portions of video data in a digital video record.

The entertainment system can discard information in the video data in the digital video record on a per-pixel basis as another way to reduce the amount of video data to be processed. For instance, each pixel can be processed to further reduce the amount of data under analysis. In the case of Red-Green-Blue (RGB) video, each pixel has a Red component, a Green component, and a Blue component. The entertainment system can process each RGB pixel and obtain a single value per pixel that represents the brightness of the pixel. Alternatively, the entertainment system could process each pixel and obtain a value that represents the magnitude of the purple color of each pixel. Also, the entertainment system could discard the Green and Blue components and process only the magnitude of the Red of each pixel. Digital video systems generally operate in the YUV color space, rather than RGB, where the Y is the luminance of the pixel, and the U and V together represent the color of the pixel. In this case, the entertainment system could discard color on a per-pixel basis and process only the luminance information. Per-pixel processing, as described, can be performed by the entertainment system at any stage of other video data reduction processes, such as before or after a scale down process performed upon the video data of a digital video record, or before or after a TWA process, etc. The selection of which values to compute on a per-pixel basis can be driven by the desirability of the per-pixel values to be stable from showing to showing of the same video frame, but somewhat unstable from frame to frame as time progresses.

By way of comparison, a scale down is a spatial operation, whereas TWA is a temporal operation. TWA, for instance, averages frames 0, 1, and 2 to obtain one (1) averaged frame. A scale down process takes the full size picture and reduces it down to a single pixel such that the picture is no longer recognizable. The single pixel from the scale down process would represent the overall color or the overall brightness of the entire frame, so in this case, there would be three pixels that represent frames 0, 1, and 2. A factor, such as the magnitude of a particular color, could be computed without doing a scale down process. However, the magnitude of a particular color might be determined by first performing a scale down process by averaging the full picture down to a single pixel and then examining the magnitude of the particular color of that one single remaining pixel.

A quick and efficient means of locating identical segments in a digital video record is desirable for an entertainment system of limited processing power. A difference metric is a value that can be computed by comparing two segments on a frame by frame basis. A given pair of frames can only add to the value computed by the difference metric. When comparing two segments to each other, rather than process every pair of frames in the two segments, the entertainment system can process a subset thereof if a selected difference metric threshold is exceeded before the difference metric is fully computed. Early termination difference metrics are a quick way to reject or exclude non-match candidates in a digital video record (i.e. non-repeated video data) because the candidates are not close enough as determined by the selected difference metric threshold. Thus, every pair of frames need not be processed.

If all frames of the digital video record are to be used to find repeated video data, the offset of each frame of the digital video record is considered. Each offset in the digital video record is used as a base offset to determine the set of frames under consideration, excluding those base offsets that would otherwise attempt to use a frame outside the digital video record. For example, for offset 0, the frames 0+0, 0+10, and 0+30, or the frames 0, 10, and 30 might be considered. The offsets from the base offset (e.g. 0,10,30) do not change during analysis, whether that analysis spans multiple digital video record's or is only performed within a single digital video record. The selected frames to be reviewed are then compared to a database of known commercials and an evaluation is made to see if these three frames match something in the database. If not, then the offset is incremented from zero to one so that the Frame0 is now Frame1, Frame10 becomes Frame 11, and Frame30 becomes Frame31. Then another evaluation is made to see if these three new frames match anything in the database. This incrementing continues, by one (1) to 2, 12, and 32, etc, until the last base offset is considered. Because comparing the digital video record to itself or to the database of known commercials can be computationally rigorous, it is faster to compare the digital video record to a data-reduced database of known commercials, where each reduced dataset in the database has a pointer to the rest of the corresponding frames, or a pointer to where the reduced versions of those frames can be located which are needed to do a more complete difference metric calculation. As such, the data-reduced database of known commercial can be small enough to be stored in a random access memory (RAM) of a consumer electronics entertainment system. By keeping the database small a hard drive need not be used, with its inherent time intensive constraints, and the processing time for the comparison algorithms can be faster than if a hard drive was required to store the database. Even if the database is too large to fit in available RAM, the database will occupy only a relatively small amount of hard drive space, and can be structured to require reading only a subset of the database when doing a single compare of a set of frames within a digital video record to the database.

Figure 6:
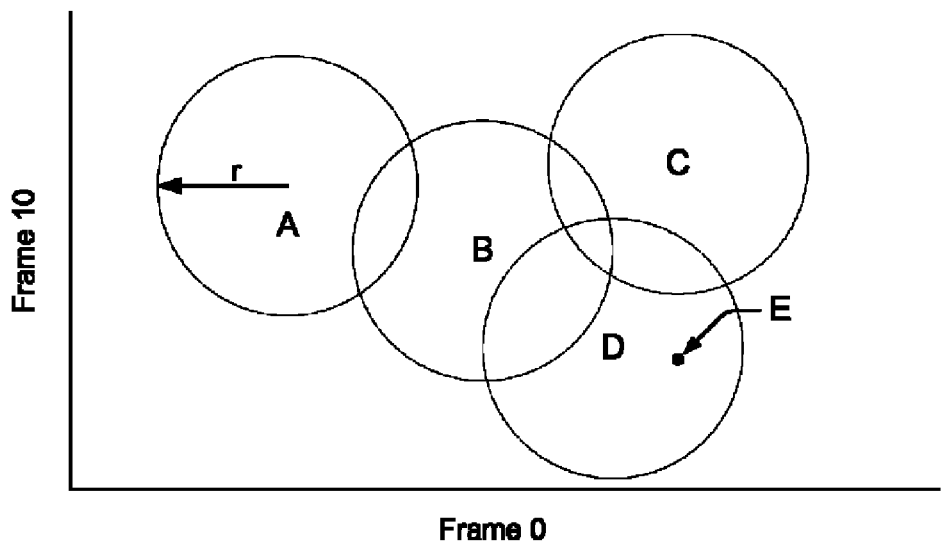
FIG. 6 depicts a spatial data structure being used to compare a particular set of video data to other sets of video data.

FIG. 6 is an illustration of a populated spatial data structure where one Frame0, Frame10 pair per known commercial in the database is shown so as to make a 2D plot of total luminance, or another factor such as how bright the red or how bright the blue is from every frame. FIG. 6 shows representative graphics for four (4) different known commercials in the preexisting database, namely circles A, B, C, and D. A point 'E' seen in FIG. 6 represents a portion of a digital video record that will not be substantially identical to commercials A-C, as seen by its location outside of the respective graphically representative circles. Point E, however, might be a candidate for being substantially identical to commercial D as seen by its location inside of its graphically representative circles D.

The radius r of circle A represents the maximum value resulting from a full difference metric calculation below which two segments of video are considered substantially identical. The plotted difference metric can operate on other parameters, including the brightness of any particular color. Here a scale down process of the frames may first be desirable to reduce the amount of data and to limit the effect of frame alignment and frame shifts. A given algorithm for detecting the presence of duplicates need not explicitly compute a distance from a particular plotted point based at a base offset in the digital video record to each commercial in the spatial data structure. Rather, the algorithm can use a spatial data structure to avoid making computations on a per-known-commercial basis for each base offset. Such an algorithm only needs to compute the distance, and possibly the full difference metric, for those commercials that are not immediately excluded by the spatial data structure.

An alternative to a 2D circle application, discussed above, is a 3D sphere that can be made for all points equidistant by distance 'r' using three (3) frames, e.g. plotting Frame0, Frame15, and Frame30 for a point representing a commercial in the pre-existing data. A comparison of offsets in the digital video record to the volume of the sphere can be made to exclude non-matching candidates.

A full difference metric calculation requires processing all frames in two equal-length sections of the digital video record, which can be too great of a computational overhead. A faster way to perform this computation is possible because the actual difference metric value isn't needed unless it is less than a particular value above which the two segments are considered a non-match. In this faster way, the squares of the differences of values in corresponding frames in the two segments of the digital video record are added together to make a partial calculation of the distance. The sum of squared value differences may exceed the squared radius of the spatial figure (e.g. circle or sphere or n-dimensional representation) before all of the terms have been added that make up the squared distance. Once the squared distance exceeds the radius of the spatial figure, the candidate can be excluded as a possible match candidate and the remaining squared differences need not be added. The process can then quickly move to an analysis of the next match candidate. This early termination version of the distance computation can greatly reduce the number of additions and multiplications that need to be made, as compared to the full difference metric, because many match candidates will quickly turn out to be non-matches. When all of the terms in the appropriate digital video record segment have been added and the difference is not greater than the radius of the spatial figure, then the segment is a match to the commercial in the pre-existing database. The digital video record range of frames can then be flagged with the occurrence of the primary feature of a commercial repeat for further analysis under secondary features.

FIGS. 7a and 7b show processes 700 and 701, respectively, to identify commercial repeats in a digital video record using a reduced dataset for every incoming stream of digital video data that is to be matched against. At block 702 of FIG. 7a, a data reduction step, such as that discussed above, can be performed. A query is made at block 704 whether an attempt is to be made to match on all video data in a digital video record or not. If so, then process 700 proceeds to block 706 where periodic offsets within the digital video record are added to a list of offsets against which frames in the digital video record are to be examined to locate matches. If not, then process 700 proceeds to block 708 where there is performed a partial final stage commercial detection procedure that is performed without a commercial match parameter to locate data that are likely to be within or near commercials. After block 708, block 710 adds periodic offsets within the incoming stream of video data that are likely to be within commercials to the list of offsets, based upon step 708.

Process 700 moves from blocks 706 or 710 to block 712 where offsets in the list are added to the database. Then, at block 712, the offsets are used to collect parameters to create the commercial signature which is the collection of parameters and the offset. At block 716, process 700 defines the spatial data structure volume using the commercial signature. Again referring to FIG. 6, the commercial signature is inserted into the spatial data structure as an area or volume that at least encloses the area or volume around the commercial signature that is close enough to the commercial signature not to be excluded as a possible commercial match by the difference metric based solely on the parameters that go into the commercial signatures.

Process 700, seen in FIG. 7*a*, is used to build a database against which look up steps are to be taken in the identification of duplicated segments. Process 701, seen in FIG. 7*b*, performs the look up steps in the database that was built in process 700. Process 701 begins at block 718 where a search is made for commercial signatures. Stated otherwise, for every offset in the incoming stream of video data in the digital video record, block 720 collects commercial signature parameters using a similar operation to that performed to add an offset within the incoming stream of video data to the database. At block 722, the database is queried for a list of match candidate commercial signatures. The list of match candidate commercial signatures contains every commercial signature in the database whose spatial data structure volume touches or encloses the commercial signature created by block 720. With respect to FIG. 6, candidates represented by points A-C would be excluded at this point of process 700. At block 724, those candidates on the list that are not actually within the volume created by the point in the space specified by the commercial signature created in block 720 and the difference metric threshold radius are excluded. The list of match candidates can be culled somewhat in this step because the spatial data structure can return a list which contains a few candidates that are not actually within the radius. Stated otherwise, the circle or sphere created by the point and radius can be somewhat smaller than the volume that represents the circle or sphere in the spatial data structure. This slight inaccuracy is common among spatial data structures.

A process 800 in FIG. 8 identifies identical segments in the video data using the identified segments of the video data that might be identical which were identified in processes 700 and 701 of FIGS. 7*a* and 7*b*. Process 800, which can be performed for every stream being subjected to a match analysis, begins at block 802 where any outstanding data reduction upon video data in the digital video record can be accomplished, such as by using those data reduction techniques discussed above. At block 804, the first offset in the digital video record is initiated. At block 806, those commercial signatures in the digital video record are located that have not been excluded as being commercial matches at the current offset by process 701 of FIG. 7*b*. As seen in FIG. 6, those candidates that have not yet been deemed to fall outside of the circle (or a 3D sphere) would be located. The first candidate is considered at block 806 and a comparison is made at block 808 to determine similarity between the then current candidate's relevant video data stream and offset to that of the data being matched against. Stated otherwise, block 808 determines the similarity between the data at the then current candidate's offset to the data at the known commercial's offset to determine if there is a segment of video data that has a sufficient similarity and that contains the offsets that were used to obtain the parameters for the commercial signatures. If the known commercial has a known length in the database, the length of the match is limited to the known length in the database and the position of the match is as indicated by the signature-relative offset in the database.

With respect to block 808, because two or more commercials can be shown multiple times in the same sequence, the database contains not only the reduced form of the commercial, but also the length of the commercial and the offset of the first frame of the commercial relative to the first frame used in the commercial's signature, if known. Any time a match is found between a stream under analysis and a commercial in the database, if the length of the commercial in the database is known by the database, and the match is shorter than the length of the commercial in the database but still long enough to be considered a commercial, and if the non-match portion or portions (1 or 2) are all also long enough to be considered commercials, a known commercial split is undertaken, as is explained below.

A known commercial split takes one entry in the database and creates one or two additional new entries, depending on whether the non-match portion before the current match is long enough to be a commercial, and whether the non-match portion after the current match is long enough to be a commercial. The first step in a known commercial split is to duplicate the item that represents the known commercial in the database. The new item that is created is updated to refer to one of the non-match portions of the preexisting item, and the preexisting item is updated to refer to the portion of the preexisting item that is not referred to by the new item. If there is a second non-match portion of the preexisting item that is long enough to be considered a commercial, the preexisting item is again duplicated, and the newly created item is updated to refer to the remaining non-match portion of the preexisting item, and the preexisting item is updated to refer to the portion of the preexisting item that is not referred to by the second new item. Then a signature is created for all new items and all new items are inserted into the spatial data structure as separate known commercials.

If the length of the commercial is not yet known by the database, the database is updated to indicate the length of the commercial as known and equal to the length of the match, and the signature-relative offset of commercial in the database is updated to reflect the start of the match.

Block 808 can employ audio data in addition to video data in determining similarity. In this way, if the audio is found to be significantly different, a false match can be avoided. Process 800 moves to block 812 after block 808, where match parameters of the stream are set to a value derived from the length of the match for the duration of the matched segment in current stream. The match lengths can be near a duration in seconds of 10, 15, 30, etc. in order to obtain large values. Process 800 moves to block 814 where a query is made as to whether all of the data has been analyzed for the commercial matching process, e.g. are there more candidates? If not, process 800 moves to block 820, and if so the next candidate is retrieved at block 816 and process 800 moves to block 808.

At block 820, a query is made as to whether all offsets have been considered. If all offsets have been considered, then process 800 terminates for the stream of video data under consideration at block 822, and otherwise block 819 increments the offset to the next offset for the stream of video data under consideration and repeats the forgoing blocks by returning to block 805. Accordingly, video data in a digital video record can be efficiently matched to a database of known commercials to identify commercials. Also, processes 700, 701, and 800 can be used to compare video data in a digital video record against itself to identify repeated commercials in a digital video record.

Secondary Features

Secondary features that occur in video data of a digital video record, as discussed above, can be used to approximate frames in a digital video record that are transitions in or out of a commercial or non-commercial. In distinction, a secondary feature is used to approximate a frame as the point of transition, whereas a primary feature is used to approximate a range of frames. Optionally, and in addition thereto, the approximated beginning and ending frames of each range can also be used as one such secondary feature.

Different and many attributes occurring in video data from Network broadcast television programming can be used as secondary features. Any such secondary feature now known, or yet to be understood, developed, or implemented, is intended to be used and is contemplated to be within the scope of one or more embodiments of the present invention. By way of example, and not by way of limitation, several secondary features are discussed below.

Secondary features can be identified using video data analysis. One such secondary feature is the occurrence of a transition into or out of 3:2 pulldown. 3:2 pulldown is a technique that uses 59.94 fields per second to represent material that was originally 24 Frames per second (24 fps). Motion picture shows (movies) produced by studios are typically broadcast on Network television using 3:2 pulldown. If 3:2 pulldown is on, it is an indicator that the original source material was film, and if 3:2 pulldown is off, it is an indicator that the original source material was video. A change indicates a transition from film to video or from video to film. If the data in the digital video record located 30 seconds of 3:2 pulldown within a large, multiple minute recording that did not have 3:2 pulldown, a primary feature would be deemed to have occurred, in that it would be estimated that portion of the digital video record is a 30 second commercial. However, due to an absence in consistency of this phenomenon in Network broadcast television, the 30 seconds may not be a commercial. As such, shifts to or from 3:2 pulldown are more accurate in detecting transitions (i.e. a secondary feature) rather than ranges of frames (i.e. a primary feature).

Another secondary feature occurrence in video data is a change in the size and frequency of the frame type, including frame types I, P, and B. As such, changes in the size of the I, P, and/or B frames can be monitored and a threshold thereof can be set to flag the occurrence of a secondary feature. Similarly, changes in the frequency of I, P, and/or B frames in the digital video record can be monitored and a threshold thereof can be set to flag the occurrence of a secondary feature. In that this type of secondary feature is not as reliable as the 3:2 pulldown secondary feature, where both are used to identify segments of commercial and non-commercial, weighting can be used for each to provide better association of transitions and ranges into identified segments of commercials.

Yet another secondary feature occurrence in video data is a Fade-To-Black and Back (FTBAB) transition. Here, most of the pixels or a high threshold thereof, go to a color at or near black, both going both in and out of a commercial. This is a fairly reliable secondary feature and could be weighted accordingly where used with other types of secondary features.

Secondary features can be identified using non-video data analysis. One such secondary feature is the occurrence of a change in the total active audio frequency band. Another example is audio cutting out substantially, or exhibiting a Go-To-Quiet-And-Back (GTQAB) occurrence, before going in and out of a commercial. As such, a GTQAB secondary feature is a transition from a non-commercial to a commercial or vice versa. As such, this secondary feature can be used to approximate the beginning or the end of each non-commercial or commercial segment. After a nearby primary feature is identified, a GTQAB occurrence can be identified to approximate the beginning and end of commercials and non-commercials.

The foregoing discussion is directed towards Network broadcast digital video television programming that is recorded and analyzed. The present invention also contemplates and is applicable to Network broadcast analog video television programming that is digitized into frames of digital video data in a digital video record.

While aspects of the described methods, program products, and data structures can be used in any of these systems and for any types of client devices, they are described in the context of the following exemplary environment.

Exemplary Environment

Figure 9:
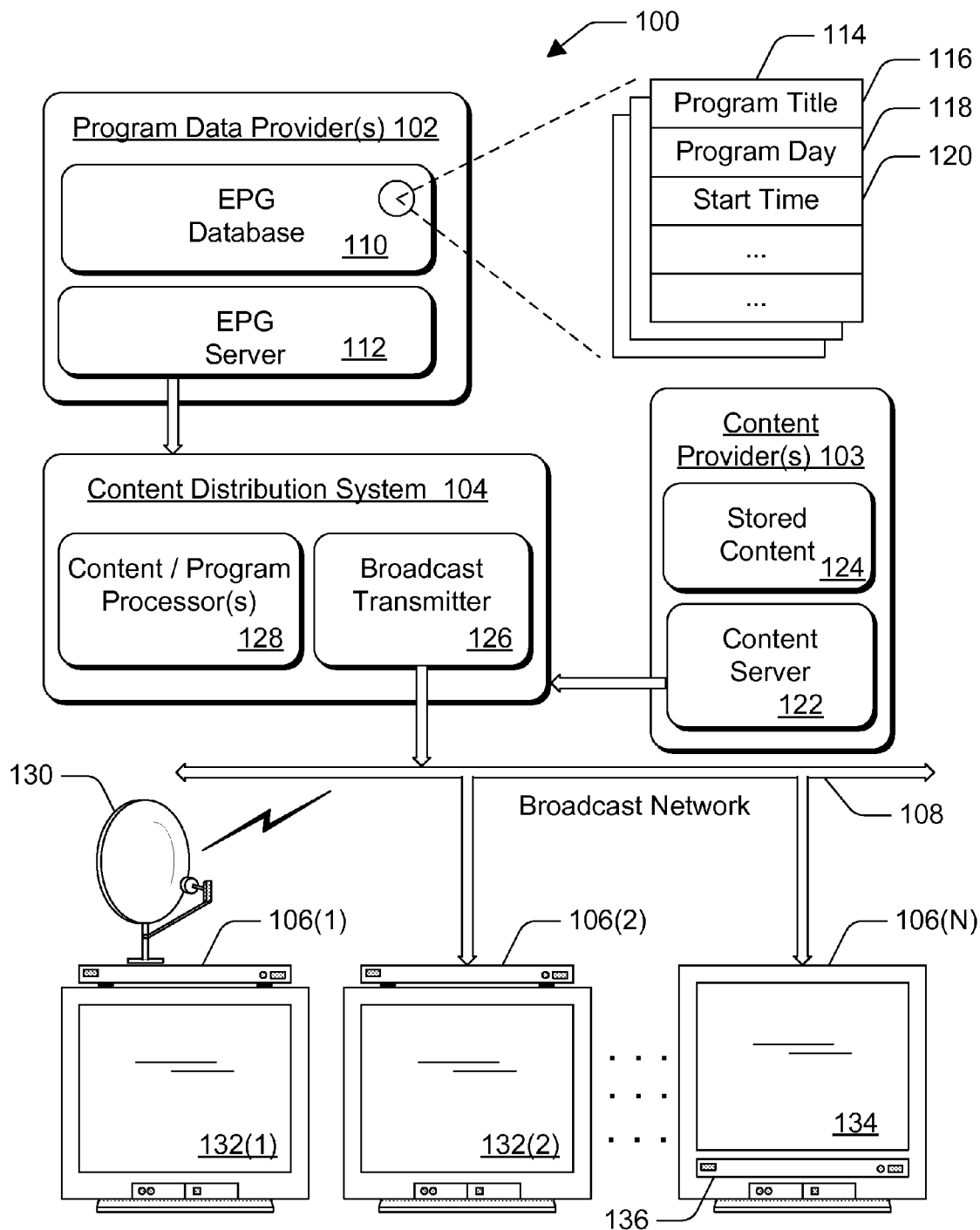
FIG. 9 illustrates an exemplary environment in which the methods, program products, and data structures described herein may be implemented.

FIG. 9 illustrates an exemplary environment 100 in which the methods, programs, and data structures described herein may be implemented. Exemplary environment 100 is a television entertainment system that facilitates distribution of content and program data to multiple viewers. The environment 100 includes one or more content providers 102, one or more program data providers 103, a content distribution system 104, and multiple client devices 106(1), 106(2), . . . , 106(N) coupled to the content distribution system 104 via a broadcast network 108.

Program provider 102 includes an electronic program guide (EPG) database 110 and an EPG server 112. The EPG database 110 stores electronic files of program data 114 which is used to generate an electronic program guide (or, "program guide") that can be separately multiplexed into a data stream. Program data includes program titles, ratings, characters, descriptions, actor names, station identifiers, channel identifiers, schedule information, and so on. The terms "program data" and "EPG data" are used interchangeably throughout this discussion. For discussion purposes, an electronic file maintains program data 114 that includes a program title 116, a program day or days 118 to identify which days of the week the program will be shown, and a start time or times 120 to identify the time that the program will be shown on the particular day or days of the week.

The EPG server 112 processes the EPG data prior to distribution to generate a published version of the program data which contains programming information for all channels for one or more days. The processing may involve any number of techniques to reduce, modify, or enhance the EPG data. Such processes might include selection of content, content compression, format modification, and the like. The EPG server 112 controls distribution of the published version of the program data from program data provider 102 to the content distribution system 104 using, for example, a file transfer protocol (FTP) over a TCP/IP network (e.g., Internet, UNIX, etc.). Alternatively, this distribution can be transmitted directly from a satellite to a local client satellite dish receiver for communication to a local client set top box.

Content provider 103 includes a content server 122 and stored content 124, such as movies, television programs, commercials, music, and similar audio and/or video content. Content provider 103, also known as a 'headend', does video insertion from a content source and an advertising source, and then places the content with insertions into a transmission link or a satellite uplink. Content server 122 controls distribution of the stored content 124 and EPG data from content provider 102 to the content distribution system 104. Additionally, content server 102 controls distribution of live content (e.g., content that was not previously stored, such as live feeds) and/or content stored at other locations to the content distribution system 104.

Content distribution system 104 contains a broadcast transmitter 126 and one or more content and program data processors 128. Broadcast transmitter 126 broadcasts signals, such as cable television signals, across broadcast network 108.

Broadcast network 108 can include a cable television network, RF, microwave, satellite, and/or data network, such as the Internet, and may also include wired or wireless media using any broadcast format or broadcast protocol. Additionally, broadcast network 108 can be any type of network, using any type of network topology and any network communication protocol, and can be represented or otherwise implemented as a combination of two or more networks.

Content and program data processor 128 processes the content and program data received from content provider 102 prior to transmitting the content and program data across broadcast network 108. A particular content processor may encode, or otherwise process, the received content into a format that is understood by the multiple client devices 106(1), 106(2), . . . , 106(N) coupled to broadcast network 108. Although FIG. 9 shows a single program data provider 102, a single content provider 103, and a single content distribution system 104, environment 100 can include any number of program data providers and content providers coupled to any number of content distribution systems.

Content distribution system 104 is representative of a headend service that provides EPG data, as well as content, to multiple subscribers. Each content distribution system 104 may receive a slightly different version of the program data that takes into account different programming preferences and lineups. The EPG server 112 creates different versions of EPG data (e.g., different versions of a program guide) that include those channels of relevance to respective headend services. Content distribution system 104 transmits the EPG data to the multiple client devices 106(1), 106(2), . . . , 106(N). In one implementation, for example, distribution system 104 utilizes a carousel file system to repeatedly broadcast the EPG data over an out-of-band (OOB) channel to the client devices 106.

Client devices 106 can be implemented in a number of ways. For example, a client device 106(1) receives broadcast content from a satellite-based transmitter via a satellite dish 130. Client device 106(1) is also referred to as a set-top box or a satellite receiving device. Client device 106(1) is coupled to a television 132(1) for presenting the content received by the client device (e.g., audio data and video data), as well as a graphical user interface. A particular client device 106 can be coupled to any number of televisions 132 and/or similar devices that can be implemented to display or otherwise render content. Similarly, any number of client devices 106 can be coupled to a television 132.

Client device 106(2) is also coupled to receive broadcast content from broadcast network 108 and provide the received content to associated television 132(2). Client device 106(N) is an example of a combination television 134 and integrated set-top box 136. In this example, the various components and functionality of the set-top box are incorporated into the television, rather than using two separate devices. The set-top box incorporated into the television may receive broadcast signals via a satellite dish (similar to satellite dish 130) and/or via broadcast network 108. In alternate implementations, client devices 106 may receive broadcast signals via the Internet or any other broadcast medium.

Each client 106 runs an electronic program guide (EPG) application that utilizes the program data. An EPG application enables a TV viewer to navigate through an onscreen program guide and locate television shows of interest to the viewer. With an EPG application, the TV viewer can look at schedules of current and future programming, set reminders for upcoming programs, and/or enter instructions to record one or more television shows.

Exemplary Client Device

Figure 10:
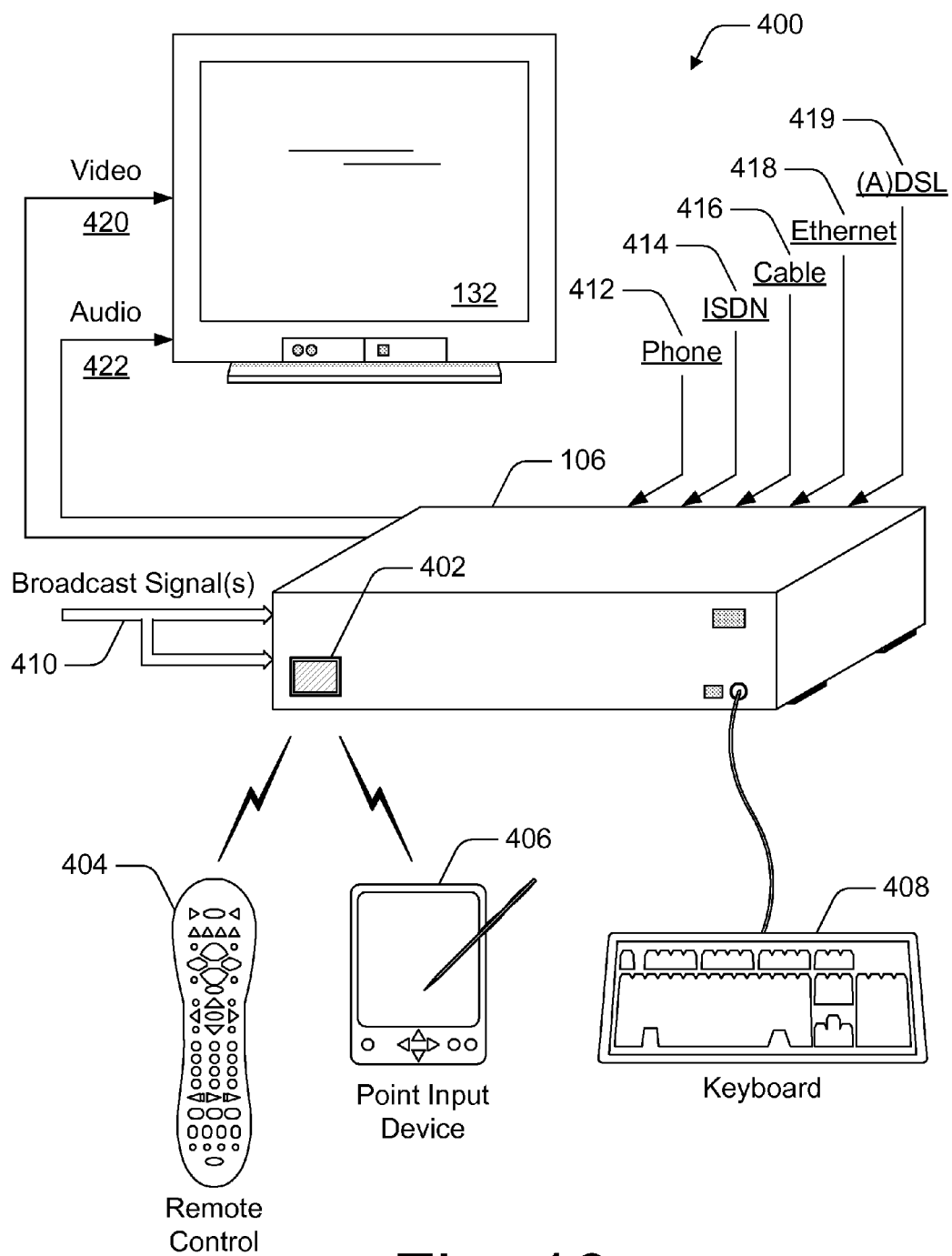
FIG. 10 illustrates of an example client device, a television, and various input devices that interact with the client device.

FIG. 10 illustrates an exemplary implementation 400 of a client device 106 shown as a standalone unit that connects to a television 132. Client device 106, which can be a television-based entertainment system such as a digital video data system, can be implemented in any number of embodiments, including as a set-top box, a satellite receiver, a TV recorder with a hard disk, a game console, an information appliance, and so forth. Client device 106 includes a wireless receiving port 402, such as an infrared (IR) or Bluetooth wireless port, for receiving wireless communications from a remote control device 404, a handheld input device 406, or any other wireless device, such as a wireless keyboard. Handheld input device 406 can be a personal digital assistant (PDA), handheld computer, wireless phone, or the like. Additionally, a wired keyboard 408 is coupled to communicate with the client device 106. In alternate embodiments, remote control device 404, handheld device 406, and/or keyboard 408 may use an RF communication link or other mode of transmission to communicate with client device 106.

Client device 106 receives one or more broadcast signals 410 from one or more broadcast sources, such as from a satellite or from a broadcast network. Client device 106 includes hardware and/or software for receiving and decoding broadcast signal 410, such as an NTSC, PAL, SECAM, MPEG or other TV system video signal. Client device 106 also includes hardware and/or software for providing the user with a graphical user interface (GUI). The GUI can be used by the user for a variety of purposes. One such purpose is to allow the user to set a predetermined percentage of the playback time of the digital video record that will most likely be taken up by the associated commercials identified by the client device 106, both for all or some for the channels that the client device 106 is capable of receiving. The user also can use the GUI, for example, to access various network services, configure the client device 106, and perform other functions.

Client device 106 is capable of communicating with other devices via one or more connections including a conventional telephone link 412, an ISDN link 414, a cable link 416, an Ethernet link 418, and a link 419 that is a DSL or an ADSL link. Client device 106 may use any one or more of the various communication links 412-419 at a particular instant to communicate with any number of other devices.

Client device 106 generates video signal(s) 420 and audio signal(s) 422, either of which can optionally be communicated to television 132 or to another video and/or audio output device. The video signals and audio signals can be communicated from client device 106 to television 132 (or other such output device) via an RF (radio frequency) link, S-video link, composite video link, component video link, or other communication link. Although not shown in FIG. 10, client device 106 may include one or more lights or other indicators identifying its current status. Additionally, the client device may include one or more control buttons, switches, or other selectable controls for controlling operation of the device.

Figure 11:
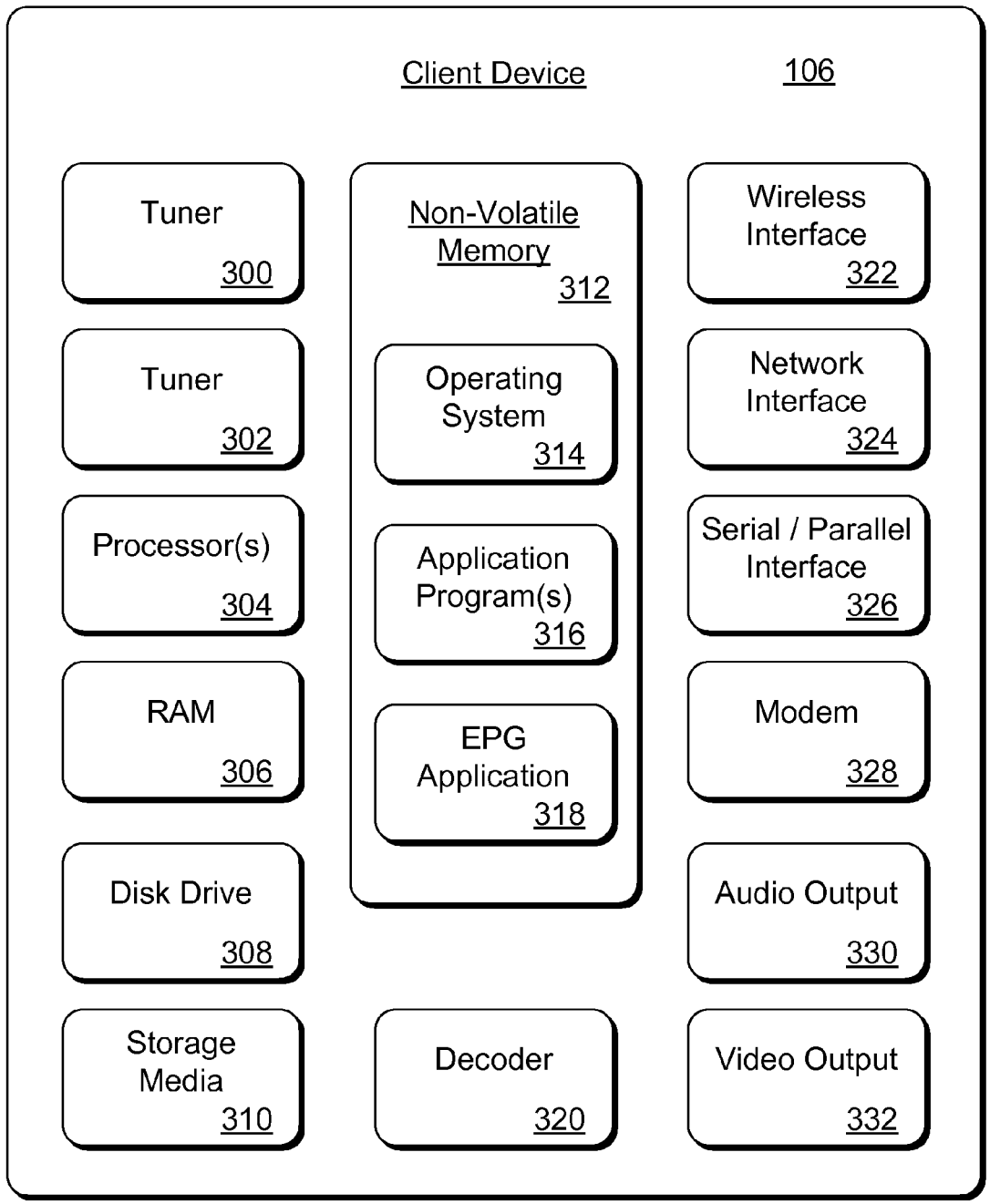
FIG. 11 is a block diagram that illustrates components of the example client device(s) shown in FIGS. 9 and 10.

FIG. 11 illustrates selected components of client device 106 shown in FIGS. 9 and 10. Client device 106 includes a first tuner 300 and an optional second tuner 302. The tuners 300 and 302 are representative of one or more in-band tuners that tune to various frequencies or channels to receive television signals, as well as an out-of-band tuner that tunes to the broadcast channel over which the EPG data is broadcast to client device 106. In the present application, it is contemplated that the EPG data can be used by client device 106 to designate primary and secondary features in a digital video record.

Client device 106 also includes one or more processors 304 and one or more memory components. Examples of possible memory components include a random access memory (RAM) 306, a disk drive 308, a mass storage component 310, and a non-volatile memory 312 (e.g., ROM, Flash, EPROM, EEPROM, etc.). Alternative implementations of client device 106 can include a range of processing and memory capabilities, and may include more or fewer types of memory components than those illustrated in FIG. 3. For example, full-resource clients can be implemented with substantial memory and processing resources, including the disk drive 308 to store content for replay by the viewer. Low-resource client devices, however, may have lower processing and memory capabilities with respect to the capacity of RAM 306, the capacity of any disk drive 308, and the processing capabilities of the client device.

Processor(s) 304 process various instructions to control the operation of client device 106 and to communicate with other electronic and computing devices. The memory components (e.g., RAM 306, disk drive 308, storage media 310, and non-volatile memory 312) store various information and/or data such as content, EPG data, configuration information for client device 106, and/or graphical user interface information.

An operating system 314 and one or more application programs 316 may be stored in non-volatile memory 312 and executed on processor 304 to provide a runtime environment. A runtime environment facilitates extensibility of client device 106 by allowing various interfaces to be defined that, in turn, allow application programs 316 to interact with client device 106. In the illustrated example, an EPG application 318 is stored in memory 312 to operate on the EPG data and generate a program guide. The application programs 316 that may be implemented at client device 106 can include programs that can approximate and flag ranges of frames in a digital video record that are commercials or non-commercials, to approximate and flag frames in a digital video record that are either the beginning or end of a commercial or a non-commercial, and to associate and flag as a commercial two of the approximated frames that are a beginning or an ending of a commercial or a non-commercial and one or more of the approximated ranges there between, where the associated commercials make up a predetermined percentage of the playback time of the digital video record.

Other application programs 316 that may be implemented at client device 106 include a browser to browse the Web, an email program to facilitate electronic mail, and so on. Client device 106 can also include other components pertaining to a television entertainment system which are not illustrated in this example for simplicity purposes. For instance, client device 106 can include a user interface application and user interface lights, buttons, controls, etc. to facilitate viewer interaction with the device.

Client device 106 also includes a decoder 320 to decode a broadcast video signal, such as an NTSC, PAL, SECAM, MPEG or other TV system video signal. Alternatively, a decoder for client device 106 can be implemented, in whole or in part, as a software application executed by processor(s) 304. Client device 106 further includes a wireless interface 322, a network interface 324, a serial and/or parallel interface 326, and a modem 328. Wireless interface 322 allows client device 106 to receive input commands and other information from a user-operated input device, such as from a remote control device or from another IR, Bluetooth, or similar RF input device.

Network interface 324 and serial and/or parallel interface 326 allows client device 106 to interact and communicate with other electronic and computing devices via various communication links. Although not shown, client device 106 may also include other types of data communication interfaces to communicate with other devices. Modem 328 facilitates client device 106 in communications with other electronic and computing devices via a conventional telephone line.

Client device 106 also includes an audio output 330 and a video output 332 that provide signals to a television or other device that processes and/or presents or otherwise renders the audio and video data. Although shown separately, some of the components of client device 106 may be implemented in an application specific integrated circuit (ASIC). Additionally, a system bus (not shown) typically connects the various components within client device 106. A system bus can be implemented as one or more of any of several types of bus structures, including a memory bus or memory controller, a peripheral bus, an accelerated graphics port, or a local bus using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus.

General reference is made herein to one or more client devices, such as client device 106. As used herein, "client device" means any electronic device having data communications, data storage capabilities, and/or functions to process signals, such as broadcast signals, received from any of a number of different sources.

Conclusion

Portions of the methods, program products, and data structures described herein may be implemented in any combination of hardware, software, and/or firmware. For example, one or more application specific integrated circuits (ASICs) or programmable logic devices (PLDs) could be designed or programmed to implement one or more portions of the methods, program products, and data structures.

Although the methods, program products, and data structures have been described in language specific to structural features and/or methodological steps, it is to be understood that the invention defined in the appended claims is not necessarily limited to the specific features or steps described. Rather, the specific features and steps are disclosed as preferred forms of implementing the claimed invention.

I claim:

1. A method comprising:
   approximating, by a processor, in a digital video record that comprises frames of video data, ranges of frames that are either commercials or non-commercials;
   approximating, by a processor, in the digital video record, frames that are either a beginning or an ending of a commercial or a non-commercial; and
   associating as a commercial two of said approximated frames that are a beginning or an ending of a commercial or a non-commercial and one or more of the approximated ranges there between until a predetermined percentage of the playback time of the digital video record is taken up by the associated commercials.

2. The method as defined in claim 1, wherein the approximating ranges of frames that are either commercials or non-commercials comprises:
   comparing multiple sets of contiguous frames to corresponding sets of frames of video data in a pre-existing database to identify substantially identical sets in the digital video record; and identifying each said substantially identical set in the digital video record as one said approximated range of frames.

3. The method as defined in claim 2, wherein the comparing multiple sets of contiguous frames to corresponding sets of frames of video data in a pre-existing database to identify substantially identical sets in the digital video record uses a dataset from the frames of video data that:
is scaled down;
has information discarded on a per pixel basis;
has been time window averaged; or
is a combination of the foregoing.

4. The method as defined in claim 3 further comprising when the length of time between adjacent said substantially identical sets is not more that a predetermined time length, identifying the frames between the adjacent said substantially identical sets as another said approximated range of frames.

5. The method as defined in claim 1, wherein the "approximating ranges of frames that are either commercials or non-commercials" comprises:
comparing closed caption text corresponding to one or more frames in frames of video data in the digital video record to a pre-existing database of text to identify a match there between;
for each said matching frame, setting the starting and ending frames of the respective range to be separated from the respective matching frame by a predetermined primary margin; and
for each said range having a corresponding said matching frame, resetting the starting and ending frames of the range, respectively, to the chronologically first and last said starting and ending frames for all of the matching frames within the range.

6. The method as defined in claim 1, wherein the "approximating ranges of frames that are either commercials or non-commercials" comprises:
dividing the frames of video data in the digital video record into a plurality of separate sets, each said set having a predetermined number of contiguous frames;
evaluating the audio volume level of each said frame in each said set to derive a maximum audio volume level for each said set;
assigning the maximum audio volume level, respectively, to each said frame in each said set;
setting as one or more of said approximated ranges those contiguous frames that have the assigned maximum audio volume level thereof higher than a predetermined audio volume level; and
setting the one or more of said approximated ranges to have respective starting and ending frames to be, respectively, the frame that is:
the chronologically first individual frame with the audio volume level thereof that exceeds the predetermined audio volume level; and
the chronologically last individual frame with the audio volume level thereof that exceeds the predetermined audio volume level.

7. The method as defined in claim 1, wherein the "approximating ranges of frames that are either commercials or non-commercials" comprises:
dividing the frames of frames of video data in the digital video record into a plurality of separate sets, each said set having a predetermined number of contiguous frames;
using an edge detection filter to evaluate the magnitude of horizontal sharpness of each said frame in each said set to derive a maximum horizontal sharpness for each said set;
assigning the maximum horizontal sharpness, respectively, to each said frame in each said set;
setting as one or more of said approximated ranges those contiguous frames that have:
the assigned maximum horizontal sharpness thereof higher than a predetermined horizontal sharpness; and
a combined time length that exceeds a predetermined duration;
setting the one or more of said approximated ranges to have respective starting and ending frames to be, respectively, the frames that is:
the chronologically first individual frame with the magnitude of horizontal sharpness thereof that exceeds the predetermined horizontal sharpness; and
the chronologically last individual frame that has the magnitude of horizontal sharpness thereof that exceeds the predetermined horizontal sharpness.

8. The method as defined in claim 1, wherein the "approximating frames that are either a beginning or an ending of a commercial or a non-commercial" comprises:
comparing sets of a predetermined number of contiguous frames in frames of video data in the digital video record to determine the local maxima of the size of a given frame type or the local maxima of the change in size of the given frame type, and when either of said local maxima in any said set exceeds a respective predetermined threshold, then identifying one said frame in said set as being one said approximated frame.

9. The method as defined in claim 1, wherein the "approximating frames that are either a beginning or an ending of a commercial or a non-commercial" comprises:
comparing sets of a predetermined number of contiguous frames in frames of video data in the digital video record to the local maxima of the frequency of a given frame type, wherein the frame type is selected from the group consisting of I, P, and B frame types, or the local maxima of the change in frequency of the given frame type, and when either of said local maxima in any said set exceeds a respective predetermined threshold, then identifying one said frame in said set as being one said approximated frame.

10. The method as defined in claim 1, wherein the "approximating frames that are either a beginning or an ending of a commercial or a non-commercial" comprises:
identifying as one said approximated frame each frame in the digital video record having a local maximum in the number of pixels containing a color no brighter than a predetermined brightness threshold that exceeds a predetermined black pixel count threshold.

11. The method as defined in claim 1, wherein the "approximating frames that are either a beginning or an ending of a commercial or a non-commercial" further comprises:
locating one or more secondary features in frames of video data in the digital video record to identify a respective plurality of said approximated frames; and
applying a weight to the respective said secondary feature to determine a final set of said approximated frames from among all of said approximated frames.

12. An entertainment system that is capable of playing back a stored digital video record that comprises frames of video data received from a television broadcast system comprising means for executing instructions that, when executed by a processor, performs the method of claim 1.

13. An entertainment system comprising:
   means for storing frames of video data received from a television broadcast system in a digital video record;
   means for storing and executing instructions that, when executed, assemble a data structure, the means for comprising:
   (i) means for identifying approximated ranges of frames that are either commercials or non-commercials;
   (ii) means for identifying approximated frames that are either a beginning or an ending of a commercial or a non-commercial; and
   (iii) means, using (i) and (ii), for associating as a commercial two of said approximated frames that are a beginning or an ending of a commercial or a non-commercial and one or more of said approximated ranges there between, wherein a predetermined percentage of the playback time of the digital video record is taken up by the associated commercials; and
   means for skipping a playback of each said associated commercial while playing back the stored digital video record.

14. The entertainment system as defined in claim 13, wherein the predetermined percentage of the playback time of the digital video record taken up by the associated commercials is about twenty percent to about thirty percent.

15. The entertainment system as defined in claim 13, wherein:
   the data structure further comprises means for representing known commercials; and
   the means for storing and executing instructions uses the means for representing known commercials with the means for identifying approximated ranges of frames that are either commercials or non-commercials to identify approximated ranges of frames that are commercials.

16. One or more computer readable memory device having instructions thereon for implementing, in an entertainment system that is capable of playing back stored video data, a method of skipping the playback of commercials in the stored video data, the method comprising:
   storing frames of video data received from a television broadcast system;
   assembling a data structure that comprises:
   (A) means for identifying approximated ranges of the frames that are either commercials or non-commercials;
   (B) means for identifying approximated frames that are either a beginning or an ending of a commercial or a non-commercial; and
   (C) means, using (A) and (B), for associating as a commercial two of said approximated frames that are a beginning or an ending of a commercial or a non-commercial and one or more of said approximated ranges there between,
   wherein a predetermined percentage of the playback time of the stored frames of video data received from the television broadcast system is taken up by the associated commercials; and
   skipping the playback of each of the associated commercials and resuming playing back of video data after each of the associated commercials.

17. The computer readable memory device as defined in claim 16, wherein the predetermined percentage of the playback time of the stored frames of video data received from the television broadcast system taken up by the associated commercials is about twenty percent to about thirty percent.

18. The computer readable memory device as defined in claim 16, wherein:
   the data structure further comprises means for representing known commercials; and
   the method further comprises instructions which cause the entertainment system to use the means for representing known commercials to identify the approximated ranges of the frames that are commercials.

19. The computer readable memory device as defined in claim 18, wherein the executable instructions cause the entertainment system to perform the further act of receiving digital video data from a television broadcast to assemble the means for representing known commercials in the data structure by identifying repeated digital video data of a predetermined duration.

20. An entertainment system that is capable of playing back a stored digital video record, the digital video record comprising frames of video data received from a television broadcast system, wherein the entertainment system comprises means for executing the executable instructions for implementing the method of the computer program product defined in claim 16.

* * * * *